United States Patent [19]

Amigues

[11] 3,946,766
[45] Mar. 30, 1976

[54] POWER LOOM DOBBY SHEDDING MOTION

[76] Inventor: Luc Amigues, 25, avenue Gabriel Peri, 94300 Vincennes, France

[22] Filed: Jan. 13, 1975

[21] Appl. No.: 540,466

[30] Foreign Application Priority Data
Jan. 28, 1974 France .............................. 74.03543

[52] U.S. Cl. .................... 139/66 R; 139/79; 74/567; 74/569
[51] Int. Cl.² .......................................... D03D 1/00
[58] Field of Search .............................. 139/66–77, 139/79–81; 74/567, 569

[56] References Cited
UNITED STATES PATENTS

| | | | |
|---|---|---|---|
| 732,606 | 6/1903 | Topliff | 74/569 X |
| 1,580,178 | 4/1926 | Talbot | 139/79 UX |
| 2,379,771 | 7/1945 | Weidauer et al. | 74/567 |
| 2,567,735 | 9/1951 | Scott | 74/569 |
| 2,687,148 | 8/1954 | Pfarrwaller | 139/79 X |
| 2,986,949 | 6/1961 | Lancaster et al. | 74/567 X |
| 3,101,745 | 8/1963 | Pfarrwaller | 139/66 R |
| 3,349,808 | 10/1967 | Gustafson et al. | 139/66 A |
| 3,807,460 | 4/1974 | Alexandr et al. | 139/76 |

FOREIGN PATENTS OR APPLICATIONS

| | | | |
|---|---|---|---|
| 895,862 | 4/1944 | France | 139/66 R |
| 734,544 | 4/1943 | Germany | 139/71 |

*Primary Examiner*—James Kee Chi
*Attorney, Agent, or Firm*—Dowell & Dowell

[57] ABSTRACT

This dobby shedding motion for power looms comprises essentially a series of twin cams mounted on a common drive shaft and oscillating arms each provided with a pair of roller followers adapted to cooperate with said cams. Each cam assembly comprises a pair of parallel discs slightly spaced in the axial direction and off-set angularly to each other, and each oscillating arm carries two pairs of strap-forming strips rotatably supporting a roller follower, each roller follower being adapted to engage one of the discs of the registering cam assembly. Said strips have extensions bent to provide inner surfaces adapted to engage the side surfaces of said discs to assist in centering the roller followers in relation to said discs. The cam assemblies and roller followers are mounted and assembled by means of bolts comprising each a frustoconical headed screw and a nut also formed with a frustoconical portion whereby tightening said bolts in properly countersunk holes will provide a reliable vibration proof assembly.

2 Claims, 3 Drawing Figures

POWER LOOM DOBBY SHEDDING MOTION

This invention relates in general to power looms and has specific reference to a dobby shedding motion or weave motion of the type wherein the actuating members consist of cams mounted with mutual suitable angular settings on a common drive or camshaft and associated with oscillating or swinging arms supporting roller followers, said arms being operatively connected in turn to the tappet levers connected to the heddle or warp frames.

It is the essential object of this invention to provide a power loom dobby shedding motion or weave motion of the type broadly set forth hereinabove, which is of particularly simplified construction and very reliable in operation, notably with respect to the oscillating arm construction and the cam disposition.

The power loom dobby shedding motion according to this invention, which comprises a series of cams mounted on a common drive shaft for actuating roller followers carried by a corresponding series of oscillating or swinging arms operatively connected to the lift levers of the conventional heddle or warp frames, each cam of said series comprising a pair of complementary races axially spaced from each other and off-set angularly, each oscillating or swinging arm carrying a pair of roller followers disposed on either side of a pivot pin belonging to the relevant arm, the roller followers of each pair being likewise disposed in axially spaced planes to as to co-operate each with one of the pair of races of the corresponding cam, this dobby shedding motion being further characterized in that each oscillating arm consist of a flat elongated member to which two pairs of strips off-set laterally on either side of the plane of said member are secured as inserts, each pair of strips constituting a strap supporting the pivot pin of one of said roller followers.

Figures 1, 3:
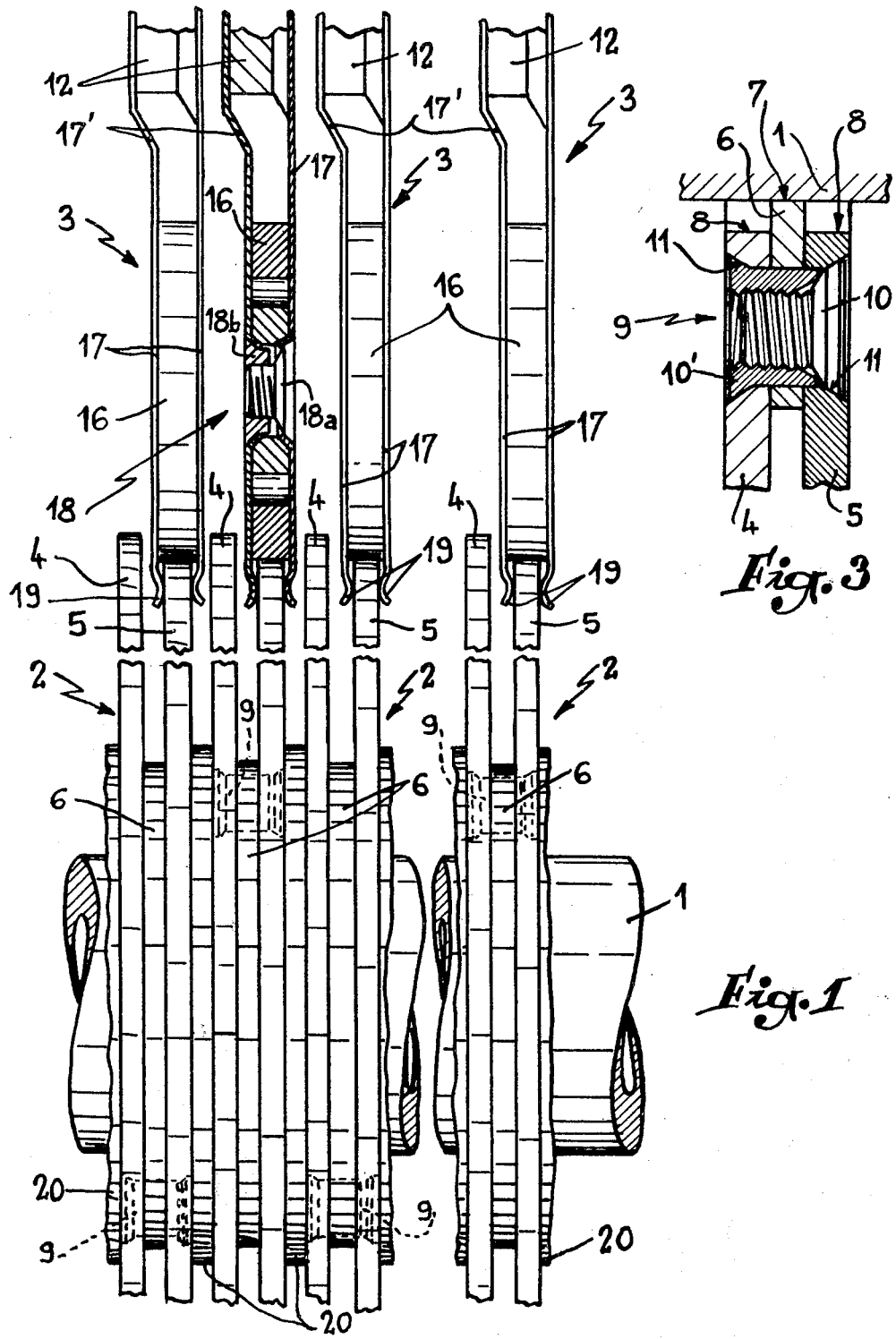
FIG. 1 is a diagrammatic plane view of this motion.
FIG. 3 is a section showing a detail of the mode of assembling the three component elements of each cam.

Referring first to FIG. 1 of the attached drawing the reference numeral 1 designates the main power shaft driving the rotary cams 2 for actuating the oscillating arms or tappets 3 operatively connected to the lifting levers of the heddle or warp frames.

Figure 2:
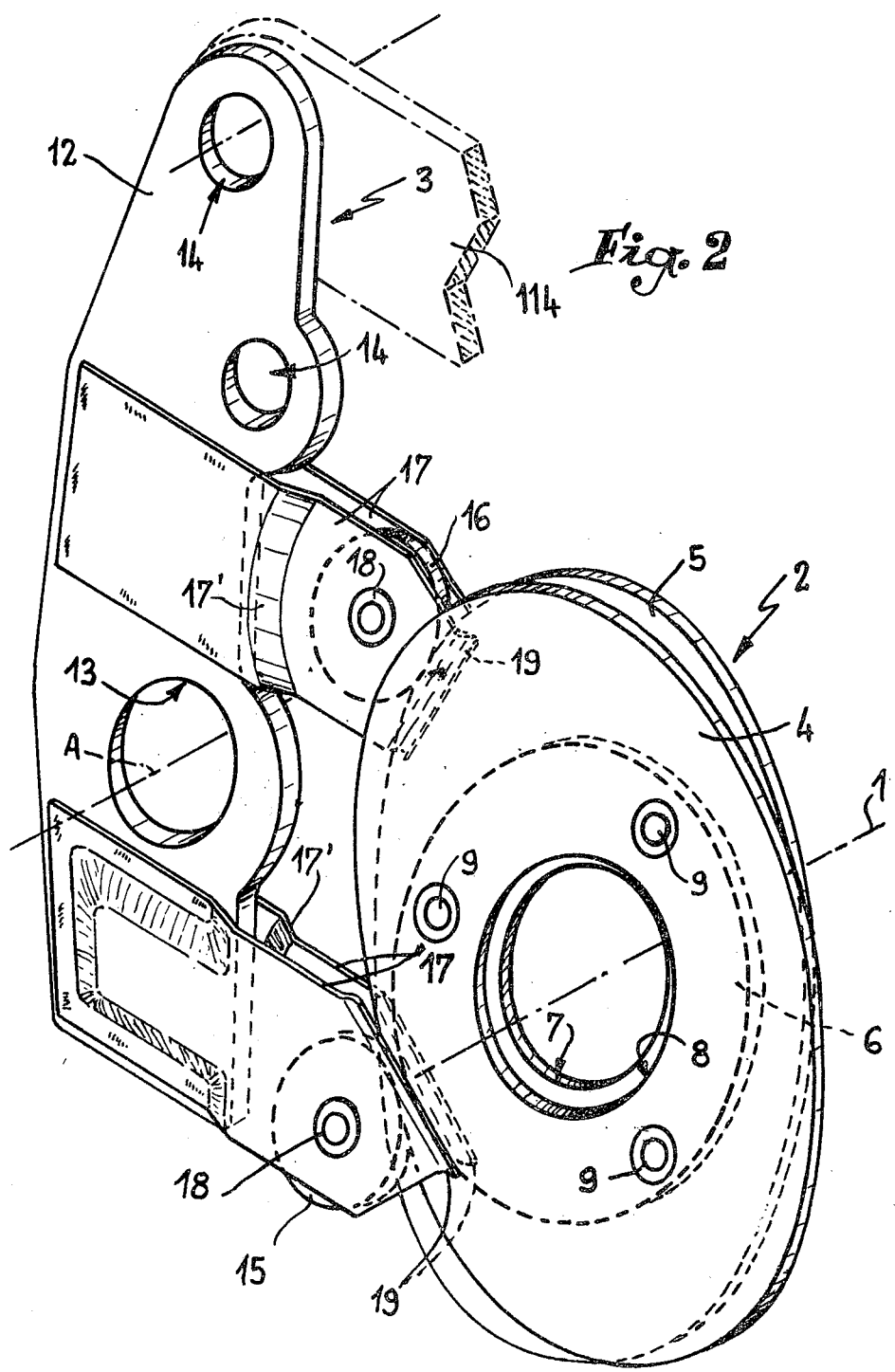
FIG. 2 is a perspective view illustrating the relative arrangement of one of the actuating cams and the oscillating arm associated therewith.

As shown more particularly in FIG. 2, each cam 2 is of the complementary type and comprises a pair of discs 4 and 5 suitably shaped and off-set angularly to each other. Interposed between the pair of discs 4, 5 is an annular spacer 6 keeping the discs 4, 5 are a relative axial spacing corresponding to the thickness of the annular member 6. In the example illustrated it will be seen that the diameter of the central aperture 7 of this spacer 6 is somewhat smaller than that of the corresponding aperture 8 formed centrally of each disc 4 and 5, whereby the shaft 1 (of which only the geometric axis is shown in FIG. 2) is engaged only by the first-named aperture 7 of said distance piece 6.

The elements 4, 5 and 6 constituting the cam 1 are assembled by means of bolts designated in general by the reference numeral 9 in FIG. 2. As illustrated in detail in FIG. 3, each bolt 9 comprises a screw 10 having a relatively large head of frustoconical configuration; this screw 10 extends through aligned holes formed in said elements 4 to 6 and is engaged at its end opposite said head by a nut 10' also formed with a frustoconical bearing surface of same taper as the head of screw 10. Besides, the outer edges of the holes formed in the pair of discs 4 and 5 and engaged by said screw and nut assembly are also countersunk with the same taper as said screw and nut, as shown at 11, so that when the bolts 9 are tightened home the frustoconical surfaces thereof fit accurately in said countersunk edges 11, thus providing a reliable wedging effect and a precise positioning of the bolts while preventing any untimely loosening thereof under the influence of vibration. Actually, each cam assembly 2 behaves like a rigid, one-piece unit.

It is obvious that the above-described cam construction is both simple and economical, and permits of dispensing with the direct machining of a solid blank as in conventional practice in the manufacture of hitherto known complementary cams. Assembling the pair of discs 4, 5 with the intermediate spacer 6 is a simple matter, and it will be noted that the bolts 9 are located at irregular intervals to avoid any risk of faulty positioning of the two discs 4, 5 in relation to each other during the assembling step.

Each oscillating arm 3 of the dobby shedding motion according to this invention comprises a flat elongated member 12 (FIG. 2) cut out from sheet metal stock. This flat member 12 has formed through it a major aperture 13 adapted to receive the pivot shaft (axis A) supporting the complete set of oscillating arms of the motion, and one or two minor apertures 14 for operatively connecting the corresponding lift lever 114 to this arm 12. On either side of the main aperture 13 the flat member 12 carries a strap constituting a support means for a roller follower 15, 16 respectively. Each strap consists of a pair of strips 17 bent at 17' to provide a pair of extensions parallel to the vertical axis of member 12 but in a plane off-set laterally thereto. It will be noted that these two straps are off-set laterally in opposite directions to each other, whereby the roller follower 16 carried by one strap registers with the race formed by the outer periphery of disc 5, while the other roller follower 15 engages the outer periphery of disc 4.

The roller followers 15 and 16 carried by each arm 3 between the strips 17 of said straps may be mounted in any known and suitable manner. Thus, in the example illustrated this mounting designated generally by the reference numeral 18 in FIG. 2 comprises (cf. FIG. 1) a screw 18a having a frustoconical head and a nut 18b formed with an identical frustoconical bearing portion, as in the case of the screw and nut assemblies 10 and 11 depicted hereinabove with reference to FIG. 3; said screw and nut 18a, 18b engage the corresponding countersunk edges of suitably positioned holes formed in strips 17 and in the side faces of the inner race of the corresponding rolling-contact bearing of the roller follower. Thus, the roller followers 15, 16 are properly held in position and the strips 17 are rigidly assembled about these followers, and any tendency to untimely shifting or loosening is safely precluded.

In the form of embodiment illustrated and described herein each roller follower 15 or 16 has a width or axial length, as far as its operative or outer periphery is concerned, slightly greater than the thickness of discs 4 and 5 of the registering cam 2. In addition, in order properly to position the roller followers with respect to the discs 4, 5 and to impart a strict self-centering characteristic to the oscillating arms 3, each pair of strips 17 project somewhat beyond the outer contour of the relevant roller followers and comprise at their outer free end a portion 19 bent twice, i.e. firstly inwards and then outwards (see FIGS. 1 and 2) so that the inner surface of this portion 19 can engage the registering side face of the companion disc in the assembled condition.

Of course, the assembly consisting of a stack of cams 2 of the dobby shedding motion according to this invention is rigidly assembled with the shaft 1, an annular distance-piece 20 being interposed between adjacent cam assemblies.

Although a specific form of embodiment of this invention has been described hereinabove and illustrated in the attached drawing, it will readily occur to those conversant with the art that various modifications and changes may be brought thereto without departing from the scope of the invention as set forth in the appended claims.

I claim:

1. A power loom dobby shedding mechanism of the type having multiple arms mounted on pivot shaft means and connected respectively to operate the lift levers of conventional heddle or warp frames when the arms are oscillated about the axis of the pivot shaft means, and the mechanism having multiple pairs of cams mounted for rotation with a drive shaft of the dobby, the cams of each pair being spaced apart along the axis of the drive shaft and having respective peripheral races disposed in opposed relationship to an arm, and each arm having two follower rollers rotatably supported thereon on different sides of said pivot shaft means and respectively contacting different races of an opposed pair of cams, and the races of each pair of cams being mutually shaped and positioned about the axis of the drive shaft so that rotation of the shaft causes oscillation of the arms, the improvements wherein:

each arm comprises a thin flat member located opposite the cams of the associated pair and within the axial extent of their races;

first and second pairs of strips, the strips in each pair being fixed to opposite sides of the arm and each pair of strips extending toward and beyond the peripheries on opposite sides of a race and each pair of strips supporting rotationally a follower roller therebetween and in contact with one of said races, the first and second pairs being mutually offset axially of the shaft means in different directions so that each pair engages a different cam;

the follower rollers having axial thicknesses greater than the cams, and the outer ends of each pair of strips beyond the roller being formed toward and then away from each other to provide surfaces riding on the sides of the cams to keep the follower rollers centered on the races.

2. The mechanism as set forth in claim 1, wherein each cam of a pair comprises a flat disc having a hole through its center larger than the diameter of said drive shaft, a spacer disc located between each pair of cam discs and each spacer disc having a hole through its center sized to fit said drive shaft, means for fastening said cam and spacer discs together through aligned holes therethrough where the holes in the cam discs are countersunk comprising headed screw and nut means threaded to engage each other in said aligned holes, and the heads of the screw and nut means being conically enlarged to fit within said countersunk holes in the cam discs.

* * * * *